United States Patent Office 3,537,992
Patented Nov. 3, 1970

3,537,992
DRILLING FLUID
Jack H. Kolaian, Houston, Tex., assignor to Texaco Inc.,
New York, N.Y., a corporation of Delaware
No Drawing. Filed Apr. 25, 1967, Ser. No. 633,419
Int. Cl. C10m 3/14
U.S. Cl. 252—8.5    12 Claims

ABSTRACT OF THE DISCLOSURE

An aqueous drilling fluid dispersant and a method of drilling wells using said drilling fluid which contains a substituted benzoic acid compound as the dispersant, namely, 1,2,4-benzenetricarboxylic acid, the corresponding anhydride, 1,2,4,5-benzenetetracarboxylic acid, 4-hydroxy - 1,3 - benzenedicarboxylic acid, 2,4-dihydroxybenzenecarboxylic acid, 2 - hydroxy-4-ethoxy-benzenecarboxylic acid, and the corresponding alkali metal including ammonium salts of these acids.

---

This invention relates to a novel aqueous drilling fluid for drilling wells through sub-surface formations by means of well drilling tools, and particularly to such an aqueous well drilling fluid having both improved dispersibility as a result of containing therein a novel dispersant as hereinafter more fully described. The invention is also concerned with a method of drilling wells employing the novel aqueous drilling fluid.

Drilling fluids, or muds as they are sometimes called, are slurries of clayey solids used in the drilling of wells for tapping underground collections of oil, gas, brine or water. Such fluids have a number of different functions, the most important of which are to assist in the removal of cuttings from the well, to seal off formations of gas, oil, or water which may be encountered at different levels, to lubricate the drilling tool and drill pipe which carries the tool, and to hold the cuttings in suspension in event of shut-downs in drilling.

An ideal drilling fluid is a thixotropic colloidal system, i.e., a fluid which on agitation or circulation (as by pumping or otherwise), has a measurable relatively low viscosity and is free flowing (not plastic), particularly at high temperatures; but when such agitation or circulation is halted, the fluid sets or gels. The rate of gel formation is such as to permit the cuttings to fall only a short distance before the gel structure is sufficiently strong to support them.

When such a drilling fluid having the proper viscosity, the proper gel rate and proper gel strength is circulated through a well bore, it has a sufficiently high viscosity to carry the cuttings and sand from the bottom of the hole to the surface and it has a gel rate such as to allow the cuttings and sand to settle in a settling pit. On standing in a quiescent state, it develops sufficient gel strength to prevent the settling of the cuttings, sand or weighting material, etc., in the well bore when it becomes necessary to discontinue circulation for any appreciable period of time. Such a fluid is also characterized by its ability to form a mud cake on the borehole wall, thereby assisting in sealing off the traversed formations and inhibiting so-called water loss, i.e., loss of water from the drilling fluid.

One of the principal problems in mud chemistry is the production of suitable drilling fluids having satisfactory dispersibility, and the necessary thixotropic properties discussed above.

In accordance with the present invention the problems of dispersibility in aqueous drilling fluids can be solved by incorporating in an aqueous drilling fluid as the dispersant a substituted benzoic acid compound selected from the group consisting of (a) substituted benzoic acid compound having the general formula

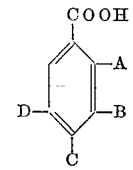

wherein A is hydrogen or carboxy, B alone is carboxy or hydrogen, C alone is carboxy, D is hydrogen or carboxy, and B and C taken together is a bivalent acid anhydride group; and when A is hydrogen, B and C each is carboxy and D is hydrogen; when A is carboxy, B is hydrogen and C and D each is carboxy; and when B and C taken together is a bivalent acid anhydride group, A and D each is hydrogen; and (b) a hydroxy substituted benzoic acid compound having the general formula

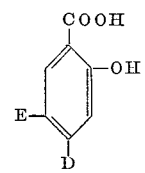

wherein D is hydrogen, hydroxy or ethoxy and wherein E is carboxy or hydrogen; and when D is hydrogen, E is carboxy; and when D is hydroxy or ethoxy, E is hydrogen, said substituted benzoic acid compound being present in the drilling fluid in an amount sufficient to reduce the viscosity thereto.

It is known from the article appearing in Zhur. Priklad. Khem. 35, pp. 638–647 (1962), "Organic Viscosity Reducer in Clay Solutions" by D. Tischenko and S. Fleisher (CA, 57, 2491g, 1962), that the ortho-dihydroxybenzenesulfonic acids, the ortho-dihydroxy-alpha-toluenesulfonic acids and water soluble salts thereof are viscosity reducing agents in clay laden drilling fluids whereas the corresponding meta- and para-dihydroxybenzenes including the corresponding sulfonic acid derivatives and water soluble salts thereof are ineffective viscosity reducing agents for aqueous drilling fluids.

The term "substituted benzoic acid compound" as used in the specification and claims is intended to cover any substituted benzoic acid compound having the above general formulae and containing the prescribed substituents in the indicated locations on the benzene ring nucleus, including the alkali metal and ammonium salts of these benzoic acids.

More particularly, representative substituted benzoic acids of the present invention include 1,2,4-benzenetricarboxylic acid anhydride, 1,2,4-benzenetricarboxylic acid, 1,2,4,5-benzenetetracarboxylic acid, 4-hydroxy - 1,3 - benzenedicarboxylic acid, 2,4 - dihydroxybenzenecarboxylic acid and 2-hydroxy-4-ethoxybenzenecarboxylic acid.

It is surprising that these compounds are effective drilling fluid dispersants when other related benzoic acid compounds such as 1,2-benzenedicarboxylic acid, 1,3-benzenedicarboxylic acid, 1,4-benzenedicarboxylic acid, 1,3,5-benzenetricarboxylic acid and 3-methoxy-4-hydroxy-benzaldehyde are ineffective dispersants in aqueous drilling fluids.

The substituted benzoic acids of the present invention may be added to an aqueous drilling fluid in amounts ranging from about 0.1 pound to about 10 pounds per barrel of drilling fluid. In general, it has been found that amounts less than 0.1 pound per barrel do not produce completely satisfactory results in terms of dispersing activity whereas amounts above about 10 lbs. per barrel are economically unattractive and no improved results are obtained therewith. A preferred range for the substituted benzoic acids of the present invention is from about 0.25 to about 5 pounds per barrel of drilling fluid for most consistent results and efficiency.

The substituted benzoic acids employed in the present invention are known compounds and the manner of their preparation is known in the art.

In the tables, gel strength (Gels) is reported as determined by a shearometer in accordance with the procedure in the American Petroleum Institute publication RP-29, results being expressed either as pounds/100 square feet or as time in seconds for a tube to settle in the mud (after the mud has stood for zero time and for 10 minutes). If it settles in more than 60 seconds, shear is reported as pounds per hundred square feet. Yield Point (YP) is calculated by subtracting the Plastic Viscosity (PV) from the Fann Viscosity reading at 300 r.p.m. Plastic Viscosity (PV) is obtained by calculation, subtracting the Fann reading at 300 r.p.m. from the 600 r.p.m. reading. Apparent Viscosity (AV) is equal to one half of the Fann Viscosity reading obtained at 600 r.p.m. The fluidity of a mud can be back calculated from these data, the results being expressed in Fann Viscosity at 600 r.p.m. and 300 r.p.m. for a direct reading viscosimeter.

The properties of the base muds are shown in the tables.

The test data set forth in the following tables indicate the surprising advantages of the substituted benzoic acids of the present invention and demonstrate the beneficial results of same in improving the dispersibility of drilling fluids.

Representative physical properties of drilling fluids both before and after addition of various materials including the substituted benzoid acids of the present invention are shown in the tables. In each example thereof the amount of material or materials added to the base muds are shown, expressed in terms of pounds of material per barrel of drilling fluid.

TABLE I

| Example | Type mud | Amount and type dispersant | PV | YP | AV, cps. | Shearometer gels, lb./100 ft.$^2$ | | pH | API W.L., cc. | Time, hours |
|---|---|---|---|---|---|---|---|---|---|---|
| | | | | | | $0^1$ | $10^1$ | | | |
| 1 | LpH[1] | 4 A[2] | 8 | 34 | | | | 9.4 | | 2 |
| | | | 8 | 19 | | | | 9.4 | | 24 |
| | | | 7 | 9 | | | | 8.1 | | 72 |
| 2 | LpH | 1 B[3] | 2 | 39 | | | | 9.7 | | 0.25 |
| | | | 7 | 18 | | | | 9.3 | | 2 |
| | | | 14 | 6 | 17 | $0^1$ | $0^{30}$ | 8.8 | | 24 |
| 2a | LpH | 4 B | 3 | 67 | 36.5 | | | 9.8 | | 0.25 |
| | | | 8 | 34 | 25 | | | 9.4 | | 2 |
| | | | 8 | 19 | 17.5 | | | 9.4 | | 24 |
| | | | 8 | 11 | 13.5 | | | 8.5 | | 28 |
| | | | 7 | 9 | 11.5 | | | 8.1 | | 72 |
| 3 | LpH | 4 C[4] | 6 | 35 | 23.5 | | | 9.8 | | 0.25 |
| | | | 7 | 16 | 15 | | | 9.6 | | 2 |
| | | | 8 | 8 | 12 | | | 9.1 | | 24 |

[1] LpH=Low pH mud.
[2] A=1,2,4-benzenetricarboxylic acid anhydride.
[3] B=1,2,4-benzenetricarboxylic acid.
[4] C=1,2,4,5-benzenetetracarboxylic acid.

The data in Table I above show that 1,2,4-benzenetricarboxylic acid and its anhydride and 1,2,4,5-benzenetetracarboxylic acid of prescribed type are effective in reducing the viscosity of aqueous drilling fluids of the low pH type.

TABLE II

| Example | Type mud | Amount and type dispersant | PV | YP | AV, cps. | Shearometer gels, lb./100 ft.$^2$ | | pH | API W.L., cc. | Time, hours |
|---|---|---|---|---|---|---|---|---|---|---|
| | | | | | | $0^1$ | $10^1$ | | | |
| 4 | LpH[1] | 0.5 D[2] | 11 | 20 | 21 | | | 9.8 | | 0.25 |
| | | | 11 | 18 | 20 | | | 9.7 | | 2 |
| | | | 15 | 11 | 20.5 | 4.0 | 6.5 | 9.2 | 14.2 | 16 |
| 4a | | 4.0 D | 5 | 10 | | | | 9.1 | | 0.25 |
| | | | 6 | 6 | | | | 9.0 | | 2 |
| | | | 9 | 10 | | $0^1$ | $0^7$ | 9.6 | 16.2 | 48 |
| 5 | LpH | 0.5 E[3] | 10 | 5 | 12.5 | | | 9.3 | | 0.25 |
| | | | 14 | 5 | 16.5 | | | 10.0 | | 2 |
| | | | 18 | 4 | 20 | $0^1$ | $0^7$ | 9.5 | 15.7 | 16 |
| 5a | | 2.0 E | 7 | 6 | 10 | | | 9.7 | | 0.25 |
| | | | 9 | 9 | 13.5 | | | 10.1 | | 2 |
| | | | 12 | 6 | 15 | $0^1$ | 3.2 | 9.8 | 14.4 | 16 |
| 6 | LpH | 0.5 F[4] | 11 | 11 | | | | | | 0.25 |
| | | | 17 | 7 | | | | | | 2 |
| | | | 19 | 8 | | $0^3$ | 3.7 | 9.6 | 13.6 | 16 |
| 6a | LpH | 2.0 F | 9 | 10 | | | | | | 0.25 |
| | | | 13 | 9 | | | | | | 2 |
| | | | 19 | 6 | | $0^3$ | 4.0 | 9.5 | 13.2 | 16 |

[1] LpH=Low pH mud.
[2] D=2,4-dihydroxybenzoic acid.
[3] E=4-hydroxy-1,3-benzenedicarboxylic acid.
[4] F=2-hydroxy-4-ethoxybenzoic acid.

The data in Table II above show that the materials used in Examples 4-6, inclusive, are capable of reducing the viscosities of low pH drilling fluids. The relatively low yield values and very low gel strength values shown for Example 4a are evidence of the good dispersing effect of 2,4-dihydroxybenzoic acid. Example 6a illustrates that 2-hydroxy-4-ethoxybenzoic acid is effective at a concentration of 2.0 pounds per barrel.

TABLE III

| Example | Type mud | Amount and type dispersant | PV | YP | AV, cps. | Shearometer gels, lb./100 ft.$^2$ | | pH | API W.L., cc. | Time, hours |
|---|---|---|---|---|---|---|---|---|---|---|
| | | | | | | 0$^1$ | 10$^1$ | | | |
| 7 | LpH$^1$ | 0.5 G$^2$ | 12 | 26 | | | | | | 0.25 |
| | | | 10 | 20 | | | | | | 2 |
| | | | 16 | 15 | 23.5 | 5.2 | 16 | 9.4 | 14.7 | 16 |
| 7a | LpH | 2 G | 6 | 59 | | | | | | 0.25 |
| | | | 12 | 21 | | | | | | 2 |
| | | | 13 | 21 | 23.5 | 11 | 20 | 9.3 | 14.6 | 16 |
| 8 | LpH | 2 H$^3$ | 1 | 83 | | | | | | 0.25 |
| | | | 9 | 55 | | | | | | 2 |
| | | | 8 | 54 | 35 | 33 | 60 | 9.2 | 15 | 16 |
| 9 | LpH | 4 I$^4$ | 7 | 47 | | | | | | 0.25 |
| | | | 5 | 25 | | | | | | 2 |
| | | | 5 | 19 | 14.5 | 7.5 | 8.7 | 9.8 | 26.9 | 24 |
| 10 | LpH | 4 J$^5$ | 6 | 38 | | | | | | 0.25 |
| | | | 9 | 19 | | | | | | 2 |
| | | | 9 | 15 | 16.5 | 11.5 | 17 | 9.4 | 19.2 | 24 |
| 11 | LpH | 0.5 K$^6$ | 7 | 41 | | | | | | 0 25 |
| | | | 11 | 23 | | | | | | 2 |
| | | | 13 | 21 | | 5.3 | 12 | 9.5 | 16 | 16 |
| 11a | LpH | 2 K | 5 | 26 | | | | | | 0.25 |
| | | | 10 | 23 | | | | | | 2 |
| | | | 11 | 20 | | 9.5 | 16 | 9.4 | 15.8 | 16 |

$^1$ LpH=Low pH mud.
$^2$ G=1,3,5-benzenetricarboxylic acid.
$^3$ H=1,2-benzenedicarboxylic acid.
$^4$ I=1,3-benzenedicarboxylic acid.
$^5$ J=1,4-benzenedicarboxylic acid.
$^6$ K=3-methoxy-4-hydroxybenzaldehyde.

The data in Table III above show that related compounds such as 1,3,5-benzenetricarboxylic acid (Examples 7 and 7a) and the three isomers of benzenedicarboxylic acid (Examples 8, 9 and 10) are ineffective drilling fluid dispersants in low pH mud systems.

Examples 11 and 11a show that 3-methoxy-4-hydroxybenzaldehyde is also an ineffective drilling fluid dispersant.

I claim:

1. An aqueous drilling fluid containing clay solids dispersed therein and as the dispersant a substituted benzoic acid compound selected from the group consisting of 4-hydroxy - 1,3-benzenedicarboxylic acid, 2,4-dihydroxybenzenecarboxylic acid and 2-hydroxy-4-ethoxybenzenecarboxylic acid, said substituted benzoic acid compound being present in the drilling fluid in an amount sufficient to reduce the viscosity thereof.

2. An aqueous drilling fluid as claimed in claim 1 wherein the substituted benzoic acid is 4-hydroxy-1,3-benzenedicarboxylic acid.

3. An aqueous drilling fluid as claimed in claim 1 wherein the substituted benzoic acid is 2,4-dihydroxybenzenecarboxylic acid.

4. An aqueous drilling fluid as claimed in claim 1 wherein the substituted benzoic acid is 2-hydroxy-4-ethoxybenzenecarboxylic acid.

5. An aqueous drilling fluid as claimed in claim 1 wherein the substituted benzoic acid is present in an amount of from about 0.1 to 10 pounds per barrel of drilling fluid.

6. An aqueous drilling fluid as claimed in claim 5 wherein the substituted benzoic acid is present in an amount of from about 0.25 to 5 pounds per barrel of drilling fluid.

7. A method of drilling wells wherein a drilling fluid is passed through the well in contact with earth formations during the drilling operations, the improvement which comprises contacting said earth formations with an aqueous drilling fluid containing clay solids dispersed therein and as the dispersant at least 0.1 pound per barrel of drilling fluid of a substituted benzoic acid compound selected from the group consisting of 4-hydroxy-1,3-benzenedicarboxylic acid, 2,4-dihydroxybenzenecarboxylic acid and 2-hydroxy-4-ethoxybenzenecarboxylic acid, said substituted benzoic acid compound being present in the drilling fluid in an amount sufficient to reduce the viscosity thereof.

8. A method as claimed in claim 7 wherein the substituted benzoic acid is 4-hydroxy-1,3-benzenedicarboxylic acid.

9. A method as claimed in claim 7 wherein the substituted benzoic acid is 2,4-dihydroxybenzenecarboxylic acid.

10. A method as claimed in claim 7 wherein the substituted benzoic acid is 2-hydroxy-4-ethoxybenzenecarboxylic acid.

11. A method as claimed in claim 7 wherein the substituted benzoic acid is present in an amount of from about 0.1 to 10 pounds per barrel of drilling fluid.

12. A method as claimed in claim 11 wherein the substituted bonzoic acid is present in an amount of from about 0.25 to 5 pounds per barrel of drilling fluid.

References Cited

UNITED STATES PATENTS

| 1,999,766 | 4/1935 | Lawton et al. | 252—8.5 |
| 2,333,133 | 11/1943 | Wayne | 252—8.5 |
| 2,545,169 | 3/1951 | Salathiel | 252—8.5 |

OTHER REFERENCES

Rogers, Composition and Properties of Oil Well Drilling Fluids, 2nd edition, published 1953 by Gulf Pub. Co. of Houston, Texas—pp. 310, 319 to 322.

HERBERT B. GUYNN, Primary Examiner

U.S. Cl. X.R.

252—356